United States Patent [19]

Dole et al.

[11] Patent Number: 4,843,042
[45] Date of Patent: Jun. 27, 1989

[54] ALKALINE EARTH FLUORIDE ADDITIVE FOR SINTERING ALUMINUM NITRIDE

[75] Inventors: Stephen L. Dole, Burnt Hills; Ronald H. Arendt, Schenectady; Wayne D. Pasco, Scotia, all of N.Y.

[73] Assignee: General Electric Company, Schenectady, N.Y.

[21] Appl. No.: 880,516

[22] Filed: Jun. 30, 1986

[51] Int. Cl.$^4$ .............................................. C04B 35/58
[52] U.S. Cl. ...................................... 501/96; 264/60; 264/65; 264/125; 264/332
[58] Field of Search .................. 501/96; 264/60, 65, 264/125, 332

[56] References Cited

U.S. PATENT DOCUMENTS

| | | | |
|---|---|---|---|
| 4,435,513 | 3/1984 | Komeya et al. | 501/96 |
| 4,517,037 | 5/1985 | Francis et al. | 501/96 X |
| 4,540,673 | 9/1985 | Takeda et al. | 501/97 X |
| 4,547,471 | 10/1985 | Huseby et al. | 501/98 |
| 4,578,232 | 3/1986 | Huseby et al. | 264/65 |
| 4,578,233 | 3/1986 | Huseby et al. | 264/65 |
| 4,578,234 | 3/1986 | Huseby et al. | 264/65 |
| 4,578,364 | 3/1986 | Huseby et al. | 501/98 |
| 4,578,365 | 3/1986 | Huseby et al. | 501/98 |
| 4,585,706 | 4/1986 | Takeda et al. | 501/96 X |
| 4,698,320 | 10/1987 | Kasori et al. | 501/96 |
| 4,711,861 | 12/1987 | Sawamura et al. | 501/96 |
| 4,719,187 | 1/1988 | Bardhan et al. | 501/97 |
| 4,746,637 | 5/1988 | Kasori et al. | 501/98 |

FOREIGN PATENT DOCUMENTS

| | | | |
|---|---|---|---|
| 166073 | 1/1986 | European Pat. Off. | 501/96 |
| 58-32072 | 2/1983 | Japan | 501/96 |
| 978734 | 12/1964 | United Kingdom | 501/96 |

OTHER PUBLICATIONS

Kuramato & Taniguchi, "Transparent AlN Ceramics", Journal of Materials Science Letters, 3 (1984), pp. 471–474.

Primary Examiner—Stephen J. Lechert, Jr.
Attorney, Agent, or Firm—Jane M. Binkowski; James C. Davis, Jr.; James Magee, Jr.

[57] ABSTRACT

An aluminum nitride ceramic body with a thermal conductivity of at least 0.5 W/cm.K at 25° C. is produced by shaping a particulate mixture of aluminum nitride powder and an additive selected from the group consisting of $CaF_2$, $SrF_2$, $BaF_2$ and mixtures thereof into a compact and liquid phase sintering the compact.

26 Claims, No Drawings

ALKALINE EARTH FLUORIDE ADDITIVE FOR SINTERING ALUMINUM NITRIDE

The present invention relates to the use of an alkaline earth fluoride additive to produce a liquid phase sintered ceramic aluminum nitride body having a minimum thermal conductivity of 0.5 W/cm.K at 25° C. and a porosity of less than 10%.

The thermal conductivity of an aluminum nitride single crystal is a strong function of dissolved oxygen and decreases with an increase in dissolved oxygen content. For example, the thermal conductivity of aluminum nitride single crystal having 0.8 wt % dissolved oxygen is about 0.8 W/cm.K whereas a suitably pure aluminum nitride single crystal, containing 300 ppm dissolved oxygen, has been measured to have a room temperature thermal conductivity of 2.8 W/cm.K.

Aluminum nitride powder has an affinity for oxygen, especially when its surface is not covered by an oxide. There are usually three different sources of oxygen in nominally pure AlN powder. Source #1 is discrete particles of $Al_2O_3$. Source #2 an oxide coating, perhaps as $Al_2O_3$, coating the AlN powder particles. Source #3 is oxygen in solution in the AlN lattice. The amount of oxygen present in the AlN lattice in AlN powder will depend on the method of preparing the AlN powder. In the present invention, an alkaline earth fluoride is used to densify and deoxidize the aluminum nitride. According to the present invention, aluminum nitride powder can be processed in air and still will be sufficiently deoxidized in the sintering step to produce a ceramic body having a thermal conductivity of at least 0.5 W/cm.K at 25° C.

Briefly stated, the present process for producing a sintered polycrystalline aluminum nitride body having a porosity of less than about 10% by volume and a thermal conductivity of at least 0.5 W/cm.K at 25° C. comprises forming a mixture comprised of aluminum nitride powder containing oxygen and an alkaline earth additive, said alkaline earth additive being a member selected from the group consisting essentially of $CaF_2$ ranging from about 2.0% by weight to about 10% by weight, $SrF_2$ ranging from about 0.5% weight to about 8% by weight, $BaF_2$ ranging from about 1% by weight to about 8% by weight, and a mixture of said member ranging from greater than about 0.2% by weight to less than about 10% by weight, said % by weight of said additive being based on the amount of said aluminum nitride powder, shaping said mixture into a compact, and sintering said compact in a nitrogen-containing nonoxidizing atmosphere at a minimum temperature of at least about 1600° C. producing said polycrystalline body, said minimum sintering temperature being sufficient to produce said sintered body.

In the present process, the aluminum nitride powder can be of commercial or technical grade. Specifically, it should not contain any impurities which would have a significantly deleterious effect on the desired properties of the resulting sintered product. The starting aluminum nitride powder used in the present process contains oxygen generally ranging in an amount up to about 4.4% by weight and usually ranging in amount from greater than about 1.0% by weight to less than about 4.0% by weight. Typically, commerially available aluminum nitride powder contains from about 1.5 weight % to about 3 weight % of oxygen and such powders are most preferred on the basis of their substantially lower cost.

Generally, the present starting aluminum nitride powder has a specific surface area which can range widely, and generally it ranges up to about 10 $m^2/g$. Frequently, it has a specific surface area greater than about 1.0 $m^2/g$, and more frequently of at least about 3.0 $m_2/g$, usually greater than about 3.2 $m^2/g$ and preferably at least about 3.4 $m^2/g$.

Generally, the present aluminum nitride powder in the present mixture, i.e. after the components have been mixed, usually by milling, has a specific surface area which can range widely, and generally it ranges to about 10 $m^2/g$. frequently, it ranges from greater than about 1.0 $m^2/g$ to about 10 $m^2/g$, more frequently from about 3.2 $m^2/g$ to about 8.0 $m^2/g$, and still more frequently from about 3.4 $m_2/g$ to about 6.0 $m^2/g$, according to BET surface area measurement. Generally, for a given composition of a compact, the higher the surface area of the aluminum nitride, the lower is the sintering temperature required to produce a sintered body of a given porosity.

In the present process, processing of the aluminum nitride powder into a compact is carried out in air or at least partly carried out in air. During such processing, the aluminum nitride powder picks up oxygen from air and any such pick up of oxygen is controllable and reproducible or does not differ significantly if carried out under the same conditions. By processing of the aluminum nitride powder into a compact, it is meant herein to include all mixing of the aluminum nitride powder to produce the present mixture, all shaping of the resulting mixture to produce the compact, as well as handling and storing of the compact before it is deoxidized by the additive.

In the present processing of aluminum nitride, the oxygen it picks up can be in any form, i.e., it initially may be oxygen, or initially it may be in some other form, such as, for example, water. The total amount of oxygen picked up by aluminum nitride from air or other media generally ranges from greater than about 0.03% by weight to less than about 3.00% by weight, and usually it ranges from about 0.10% by weight to about 1.00% by weight, and preferably from about 0.15% by weight to about 0.70% by weight, of the total weight of the aluminum nitride. Generally, the aluminum nitride in the present mixture and compact prior to sintering has an oxygen content ranging from greater than about 1.0% by weight or from greater than about 1.85% by weight to less than about 4.50% by weight, usually from about 2.00% by weight to about 4.00% by weight, and preferably it ranges from about 2.20% by weight to about 3.50% by weight, of the total weight of aluminum nitride.

The alkaline earth fluoride additive is selected from the group consisting essentially of $CaF_2$, $SrF_2$, $BaF_2$ and a mixture thereof. $CaF_2$ is useful in an amount ranging from about 0.2% by weight to about 10% by weight, preferably from about 3% by weight to about 7% by weight, and more preferably about 5% by weight based on the amount of aluminum nitride powder. $SrF_2$ is useful in an amount ranging from about 0.5% by weight to about 8% by weight, preferably from about 3% by weight to about 6% by weight, and more preferably about 5% by weight based on the amount of aluminum nitride powder. $BaF_2$ is useful in an amount ranging from about 1% weight to about 8% by weight, preferably from about 3% by weight to about 6 % by weight, and more preferably about 5% by weight based on the amount of aluminum nitride powder. A mixture of any of the present fluoride additives is also useful in an amount ranging from greater than about 0.2% by weight to less than about 10% by weight, preferably from about 3% by weight to about 6% by weight, and more preferably about 5% by weight based on the amount of aluminum nitride powder. Amounts of the present fluoride additive lower than the minimum given amount are not effective for producing the present sintered body. Amounts of the present fluoride additive higher than the maximum given amount provide no advantage and may lower the thermal conductivity of the sintered body due to the formation of too large a second phase.

The particular amount of the present alkaline earth fluoride additive used is determinable empirically and depends on such factors as the oxygen content of the aluminum nitride powder, its specific surface area, sintering temperature and the desired density and thermal conductivity of the sintered body as well as the specific additive used. Also, the particular amount of the fluoride additive used depends somewhat on sintering conditions since the present additive vaporizes away to some extent during sintering. Specifically, if the sintering steps the compact is exposed to i.e., in contact with, the sintering atmosphere, more of the additive will vaporize away than if the compact is buried in a powder, such as, for example, an aluminum nitride powder. Also, the higher the sintering temperature, the greater is the loss of floride additive.

In a given system, an increasing amount of oxygen in the aluminum nitride powder generally requires an increasing amount of the present fluoride additive to deoxidize the aluminum nitride powder sufficiently to produce the present sintered body.

Also, in a given system, generally as the specific surface area of the aluminum nitride powder is increased, the sinterability of the compact improves resulting in a sintered body of higher density. This should also enable the use of lower sintering temperatures.

In addition, in a given system, generally as the sintering temperature is increased, the density of the resulting sintered body also increases. Further, in a given system, the present operable range of fluoride additive required to density the compact narrows from the given minimum and maximum amount as the sintering temperature decreases. However, at the present higher or highest sintering temperatures, the entire given range of fluoride additive is operable.

In carrying out the present process, a substantially or at least a significantly uniform mixture of the aluminum nitride powder and alkaline earth additive is formed and such mixture can be formed by a number of techniques. Preferably, the powders are ball milled in a liquid medium at ambient pressure and temperature to produce a uniform or significantly uniform dispersion. The milling media, which usually are in the form of cylinders or balls, should have no significant deleterious effect on the powders, and preferably, they are comprised of polycrystalline aluminum nitride. The liquid medium should have no significantly deleterious effect on the powders and preferably it is non-aqueous. Preferably, the liquid mixing or milling medium can be evaporated away completely at a temperature ranging from above room or ambient temperature to below 300° C. leaving the present mixture. Preferably, the liquid mixing medium is an organic liquid such as heptane or hexane.

Also, preferably the liquid milling medium contains a dispersant for the aluminum nitride powder thereby producing a uniform or significantly uniform mixture in a significally shorter period of milling time. Such dispersant should be used in a dispersing amount and it should evaporate or decompose and evaporate away completely or leave no significant residue, i.e., no residue which has a significant deleterious effect in the present process, at an elevated temperature below 100° C. Generally, the amount of such dispersant ranges from about 0.1% by weight to less than about 3% by weight of the aluminum nitride powder, and generally it is an organic liquid, perferably oleic acid.

The liquid dispersion can be dried by a number of conventional techniques to remove or evaporate away the liquid and produce the present particulate mixture. If desired, drying can be carried out in air. Drying of a milled liquid dispersion in air causes the aluminum nitride to pick up oxygen and when carried out under the same conditions, such oxygen pick up is reproducible or does not differ significantly. Also, if disired, the dispersion can be spray dried.

Generally, the alkaline earth fluoride additive in the present mixture has a specific surface area which can range widely. Generally, it is greater than about 0.4 m²/g and frequently it ranges from greater than about 0.4 m² to about 6.0 m²/g, usually from about 1.0 m²/g to about 5.0 m²/g.

Shaping of the present mixture into a compact can be carried out by a number of techniques such as extrusion, injection molding, die pressing, isostatic pressing, slip casting, roll compaction or forming or tape casting to produce the compact of desired shape. Any lubricants, binders or similar shaping aid materials used to aid shaping of the mixture should have no significant deteriorating effect on the compact or the present resulting sintered body. Such shaping-aid materials are preferably of the type which evaporate away on heating at relatively low temperatures, preferably below 400° C., leaving no significant residue. Preferably, after removal of the shaping aid materials, the compact has a porosity of less than 60% and more preferably less than 50% to promote densification during sintering.

In a compact, an aluminum nitride containing oxygen in an amount of about 4.5% by weight or more generally is not desirable.

In the present sintering, the additive reacts with the oxygen of the aluminum nitride powder producing a fluoride gas which evaporates away. Using $CaF_2$ as an example, it is believed that the following deoxidation reaction occurs wherein the oxygen content of the aluminum nitride is given as $Al_2O_3$:

$$3CaF_2 + Al_2O_3 \rightarrow 3CaO + 2AlF_{3\,(g)} \qquad (1)$$

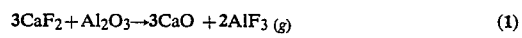

In the deoxidation effected by the present fluoride additive, aluminum fluoride is produced which is volatile at temperatures above 1300° C. and which vaporizes away in the present sintering step thereby removing the fluorine component.

The CaO formed in situ combines with $Al_2O_3$ to produce a calcium aluminate phase which can be as follows:

$$3CaO + Al_2O_3 \rightarrow CaAl_2O_4 \qquad (2)$$

The specific amount of fluoride additive required to produce the present sintered body can be determined by a number of techniques. It can be determined empirically. Preferably, an initial approximate amount of additive is calculated from Equation (1), that is the stoichiometric amount for $CaF_2$ set forth in Equation (1), and using such approximate amount, the specific amount of $CaF_2$ required in the present process to produce the present sintered body would require one or a few runs to determine if too little $CaF_2$ had been added, or to optimize the amount of $CaF_2$. Specifically, this can be done by determining the porosity of the sintered body and its thermal conductivity.

The present compact is densified, i.e., liquid-phase sintered, at a temperature which is a sintering temperature for the composition of the compact to produce the present polycrystalline body having a porosity of less than about 10% by volume of the sintered body. This sintering temperature is at least about 1600° C. and generally ranges from about 1600° C. to about 2050° C. with the minimum sintering temperature increasing as the amount of oxygen content of aluminum nitride is decreased. In the present invention, for a compact having a given amount of the alkaline earth component, the minimum sintering temperature increases as the oxygen content of the aluminum nitride decreases. Also, the minimum sintering temperature increases as the minimum or maximun amount of the fluoride additive is approached. Minimum sintering temperature is depending most strongly on composition and less strongly on particle size of the aluminum nitride and the green density of the compact, i.e., the porosity of the compact after removal of shaping aid materials.

To carry out the present liquid phase sintering, the present compact should contain a sufficient amount of the alkaline earth component i.e., Ca, Sr or Ba, as well as a sufficient amount of oxygen contained in the aluminum nitride powder to form a sufficient amount of liquid phase at sintering temperature to density the compact to produce the present sintered body. The present minimum densification, i.e., sintering, temperature depends mostly on the composition of the compact, i.e., the amount of liquid phase it generates. Specifically, for a sintering temperature to be operable in the present invention, it must generate at least sufficient liquid phase in the particular composition of the compact to carry out the present liquid phase sintering to produce the present product. For a given composition, the lower the sintering temperature, the smaller is the amount of liquid phase generated, i.e., densification becomes more difficult with decreasing sintering temperature. However, a sintering temperature higher than about 2052° C. provides no significant advantage. Frequently, the present sintering temperature ranges from about 1600° C, to about 2000° C., preferably from about 1800° C. to about 1950° C, and more preferably from about 1850° C. to about 1950° C.

The compact is sintered, preferably at ambient pressure, in a gaseous nitrogen-containing nonoxidizing atmosphere which contains at least sufficient nitrogen to prevent significant weight loss of aluminum nitride. In accordance with the present invention, nitrogen is a necessary component of the sintering atmosphere to prevent any significant weight loss of AlN during sintering. Significant weight loss of the aluminum nitride can vary depending on its surface area to volume ratio, i.e., depending on the form of the body, for example, whether it is in the form of a thin or thick tape. As a result, generally, significant weight loss of aluminum nitride ranges from in excess of about 5% by weight to in excess of about 10% weight of the aluminum nitride. Preferably, the nitrogen-containing atmosphere is nitrogen, or it is a mixture of at least about 25% by volume nitrogen and a gas selected from the group consisting of hydrogen, a noble gas such as argon and mixtures thereof. Also, preferably, the nitrogen-containing atmosphere is comprised of a mixture of nitrogen and hydrogen, especially a mixture containing up to about 5% by volume, preferably about 2% by volume, of hydrogen.

Sintering time is determinable empirically. Typically, sintering time ranges from about 40 minutes to about 90 minutes.

The polycrystalline aluminum nitride body produced by the present process is comprised of a polycrystalline aluminum nitride phase, i.e., the primary phase, and a second polycrystalline alkaline earth aluminate phase. The composition of this second phase can vary depending largely on the composition of the compact, i.e., the unsintered body, and sintering temperature.

The amount of the polycrystalline aluminate second phase can vary depending largely on the amount of fluoride additive used, the extent to which it vaporized away in the sintering step, and the oxygen content of the aluminum nitride.

When $CaF_2$ is the additive, the sintered body will contain a calcium aluminate phase, usually $CaAl_2O_4$ or $CaAl_4O_7$, ranging from about 0.1% by volume to about 10% by volume, preferably from about 0.1% by volume to about 6% by volume, and more preferably from about 0.1% by volume to about 3% by volume of the sintered body.

When $SrF_2$ is the additive, the sintered body will contain a strontium aluminate phase, usually $SrAl_{12}O_{19}$ or $Sr_2Al_2O_4$, ranging from about 0.1% by volume to about 7% by volume, preferably from about 0.1% by volume to about 5% by volume, and more preferably from about 0.1% by volume to about 3% to volume of the sintered body.

When $BaF_2$ is the additive, the sintered body will contain a barium aluminate phase, usually $BaAl_{12}O_{19}$ or $BaAl_2O_4$, ranging from about 0.1% by volume to about 6% by volume, preferably from about 0.1% by volume to about 4% by volume, and more preferably from about 0.1% by volume to about 3% by volume of the sintered body.

The present sintered polycrystalline body is a pressureless sintered ceramic body. By pressureless sintering herein it is meant the densification or consolidation of the compact without the application of mechanical pressure in the sintering step into a ceramic body having a porosity of less than about 10% by volume.

The polycrystalline body of the present invention is liquid-phase sintered i.e., it sinters due to the presence of a liquid phase, that is liquid at the sintering temperature and is rich in the alkaline earth component and oxygen and contains some aluminum and possibly nitrogen. In the present polycrystalline body, the aluminum nitride grains have about the same dimensions in all directions, and are not elongated or disk shaped. Generally, the aluminum nitride in the present polycrystalline body has an average grain size ranging from about 1 micron to about 20 microns. An intergranular second phase of an alkaline earth aluminate is present along some of the aluminum nitride grain boundaries. The morphology of the microstructure of the present sintered body indicates thas this intergranular second phase was a liquid at the sintering temperature.

The present sintered body has a porosity of less than about 10% by volume, preferably less than aboutm 4% by volume, more preferably, less than about 2%, and most preferably less than about 1% by volume of the sintered body. Any pores in the sintered body are fine sized, and generally they are less than about 1 micron in diameter. Porosity can be determined by standard metallographic procedures and by standard density measurements.

The present process is a control process for producing a sintered body of aluminum nitride having a thermal conductivity of at least 0.5 W/cm.K at 25° C. The thermal conductivity of the present polycrystalline body is less than that of a high purity single crystal of aluminum nitride which is about 2.8 W/cm.K at 25° C. If the same procedure and conditions are used throughout the present process, the resulting sintered body has a thermal conductivity and composition which is reproducible or does not differ significantly. Generally, thermal conductivity increases with a decrease in volume % of second phase, and for a given composition with increase in sintering temperature.

In the present process, aluminum nitride picks up oxygen in a controllable or substantially controllable manner. Specifically, if the same procedure and conditions are used in the present process, the amount of oxygen picked up by aluminum nitride is reproducible or does not differ significantly. Also, the present alkaline earth flruoride does not pick up oxygen, or does not pick up any significant amount of oxygen, from air or other media in the present process. More specifically, the present alkaline earth fluoride does not pick up any amount of oxygen in any form from the air or other media which would have any significant effect on the controllability or reproducibility of the present process. Any oxygen which the additive might pick up in the present process is so small as to have no effect or on significant effect on the thermal conductivity or composition of the resulting sintered body.

In the present invention, oxygen content may be determined by neutron activation analysis.

By ambient pressure herein, it is meant atmospheric or about atmospheric pressure.

By specific surface area or surface area of a powder herein, it is meant the specific surface area according to BET surface area measurement.

The present invention makes it possible to fabricate simple, complex and/or hollow shaped polycrystalline aluminum nitride ceramic articles directly. Specifically, the present sintered body can be produced in the form of a useful shaped article without machining or without any significant machining, such as a hollow shaped article for use as a container, a crucible, a thin walled tube, a long rod, a spherical body, a tape, substrate or carrier. It is useful as a sheath for temperature sensors. It is especially useful as a substrate for a semiconductor such as a silicon chip. The dimensions of the present sintered body differ from those of the unsintered body, by the extent of shrinkage i.e., densification, which occurs during sintering.

The present ceramic body has a number of uses. In the form of a thin flat piece, i.e., in the form of a substrate or tape, it is especially useful as packaging for integrated circuits and as a substrate for a integrated circuit, particularly as a substrate for a semiconducting Si chip for use in computers.

The invention is further illustrated by the following examples wherein the procedure was as follows, unless otherwise stated:

The starting aluminum nitride powder contained oxygen in an amount of about 2% by weight and had a specific surface area of about 5 m²/g.

The starting aluminum nitride powder was greater than 99% pure AlN exclusive of oxygen.

The alkaline earth fluoride additive, before any mixing, had a specific surface area of approximately 0.1 m²/g or greater (powders generally -325 mesh or finer).

Non-aqueous heptane was used to carry out the mixing, i.e., milling, of the powders. In some of the examples, oleic acid, or dioctyl phthalate, or a commercially available dispersant comprised of polyoxypropylene and polyoxyethylene, was added to the heptane in an amount of about ½% by weight of the particulate mixture. The milling media was tungsten carbide in the approximate form of balls having a density of about 100%.

In Examples 1-3 the aluminum nitride powder alone, and in the remaining examples the aluminum nitride and alkaline earth fluoride powders, were immersed in the liquid milling medium in a plastic jar and vibratory milled in the closed jar at room temperature for the given period of time.

The milled liquid dispersion of the aluminum nitride powder or given powder mixture was dried at ambient pressure in air at ambient temperature or under a heat lamp under a cover of nitrogen.

In Example 2, after being milled for 7 hours, the aluminum nitride powder had a specific surface area of about 6 m²/g, and in Example 3, after 16 hours of milling, its specific surface area was about 8 m²/g.

The dried milled powder in Examples 1-3, or dried powder mixture in Examples 4-31, was die pressed typically at about 5 Kpsi in air at room temperature to produce a compact having a density of roughly 55% to 60% of its theoretical density.

Each compact was in the form of a disk of substantially uniform thickness ranging from about ¼ inch to about 1 inch. The disk had a diameter of about ⅜ inch or about ⅝ inch.

The furnace was a tungsten heater element furnace.

In all of the examples, the compacts were placed on a tungsten plate before firing.

All compacts were fired in an atmosphere of nitrogen and held at the given sintering temperature for 1 hour.

The firing atmosphere was at ambient pressure, i.e., atmospheric or about atmospheric pressure.

At the completion of firing, the samples were furnace-cooled to about room temperature.

All of the examples of Table I were carried out in substantially the same manner except as indicated in Table I and except as indicated herein.

Density of the sintered body was determined by the Archimedes method.

Porosity in % by volume of the sintered body was determined by knowing the theoretical density of the sintered body on the basis of its composition and comparing that to the density measured using the following equation:

$$\text{porosity} = \left(1 - \frac{\text{measured density}}{\text{theoretical density}}\right) 100\% \tag{3}$$

Phase composition of the sintered body was determined by optical microscopy and/or X-ray diffraction analysis.

Based on the predetermined oxygen content of the starting AlN powder and the measured compositions of some of the resulting sintered bodies, as well as other experiments, it was calculated or estimated that in every example in Table I, the aluminum nitride in the compact before sintering had an oxygen content of roughtly about 0.3% by weight higher than that of the starting aluminum nitride powder.

The thermal conductivity of the sintered body of the examples, except Examples 10, 19 and 28, was measured at 25° C. by a steady state heat-flow method using a rodshaped sample ~0.4 cm ×0.4 cm ×2.2 cm sectioned from the sintered body. This method was orginally devised by A. Berget in 1888 and is described in an article by G. A. Slack in the "Encyclopedic Dictionary of Physics", Ed. by J. Thewlis, Pergamon, Oxford, 1961. In this technique the sample is placed inside a high-vacuum chamber, heat is supplied at one end by an electrical heater, and the temperatures are measured with fine-wire thermocouples. The sample is surrounded by the guard cylinder. The absolute accuracy is about ±3% and the repeatability is about ±1%. As a comparison, the thermal conductivity of an $Al_2O_3$ single crystal was measured with a similar apparatus to be 0.44 W/cm.K at about 22° C.

The thermal conductivity of the sintered body of Examples 10, 19 and 28 was measured by laser flash at about 25° C.

The examples are illustrated in Table I.

Additive wt % in Table I shows the weight % of the given additive used in Examples 4–31 based on the amount of aluminum nitride powder. Examples 1–3 were control samples, i.e., only aluminum nitride powder was used to form the compact.

Heat-Up Time, hrs in Table I is the time it took to reach the given sintering temperature.

TABLE 1

| Example | Additive wt % | Milling Time, hrs | Heat-Up Time/hrs | Sintering T. °C. | Sintered Density g/cm³ | Approximate Porosity vol % | Second Phases | Thermal Conductivity W/cm K at 25° C. |
|---|---|---|---|---|---|---|---|---|
| 1 | None | 4 | 1 | 1850 | 2.64 | 19 | — | — |
| 2 | None | 7 | 1.5 | 1900 | 2.73 | 16 | — | — |
| 3 | None | 16 | 1 | 1975 | 3.10 | 5 | — | 0.4 |
| 4 | 0.2 $CaF_2$ | 4 | 1.5 | 1800 | 3.23 | 1 | — | 0.7 |
| 5 | 1 $CaF_2$ | 4 | 1.5 | 1600 | 2.50 | 24 | — | — |
| 6 | 1 $CaF_2$ | 4 | 1.5 | 1700 | 3.12 | 5 | — | — |
| 7 | 1 $CaF_2$ | 4 | 1.5 | 1800 | 3.23 | 1 | $CaAl_4O_7$ | — |
| 8 | 5 $CaF_2$ | 10 | 1 | 1600 | 3.13 | 4 | — | — |
| 9 | 5 $CaF_2$ | 10 | 1 | 1850 | 3.23 | 1 | $CaAl_2O_4$ | — |
| 10 | 5 $CaF_2$ | 7 | 3 | 1900 | 3.17 | 3 | — | 1.0 |
| 11 | 10 $CaF_2$ | 4 | 1 | 1800 | 2.98 | 9 | $CaAl_2O_4$ | — |
| 12 | 10 $CaF_2$ | 4 | 1.5 | 1900 | 3.07 | 6 | — | — |
| 13 | 0.5 $SrF_2$ | 4 | 1.5 | 1850 | 3.26 | 1 | — | — |
| 14 | 1 $SrF_2$ | 7 | 1 | 1700 | 2.65 | 20 | — | — |
| 15 | 1 $SrF_2$ | 7 | 1.5 | 1800 | 3.12 | 5 | $SrAl_{12}O_{19}$ | — |
| 16 | 2 $SrF_2$ | 7 | 1 | 1700 | 2.84 | 14 | — | — |
| 17 | 2 $SrF_2$ | 7 | 1.5 | 1750 | 3.11 | 6 | — | — |
| 18 | 2 $SrF_2$ | 7 | 1 | 1800 | 3.25 | 2 | — | — |
| 19 | 2 $SrF_2$ | 7 | 1.5 | 1900 | 3.22 | 3 | — | 0.7 |
| 20 | 8 $SrF_2$ | 7 | 1 | 1900 | 2.85 | 13 | — | — |
| 21 | 8 $SrF_2$ | 7 | 1 | 1950 | 2.97 | 10 | $SrAl_2O_4$ | — |
| 22 | 1 $BaF_2$ | 7 | 1.5 | 1800 | 2.48 | 25 | — | — |
| 23 | 1 $BaF_2$ | 7 | 1.5 | 1900 | 3.05 | 7 | — | — |
| 24 | 1.5 $BaF_2$ | 4 | 1 | 1800 | 2.93 | 11 | — | — |
| 25 | 1.5 $BaF_2$ | 4 | 1.5 | 1830 | 3.26 | 1 | $BaAl_{12}O_{19}$ | — |
| 26 | 3 $BaF_2$ | 7 | 1 | 1800 | 2.74 | 17 | — | — |
| 27 | 3 $BaF_2$ | 7 | 1.5 | 1850 | 3.18 | 4 | — | — |
| 28 | 3 $BaF_2$ | 7 | 1.5 | 1900 | 3.25 | 2 | — | 0.6 |
| 29 | 5 $BaF_2$ | 7 | 1.5 | 1950 | 3.20 | 3 | — | — |
| 30 | 8 $BaF_2$ | 7 | 1 | 1950 | 2.96 | 10 | $BaAl_2O_4$ | — |
| 31 | 10 $BaF_2$ | 7 | 1.5 | 1950 | 2.76 | 17 | — | — |

Examples 4, 6–13, 15, 17–19, 23, 25 and 27–29 illustrate the present invention.

In Example 4 the thermal conductivity of the sintered body was determined to be 0.7 W/cm.K at 25° C. and in Example 10 it was 1.0 W/cm.K at 25° C. From a comparison of Examples 4 and 6–12 and other work, it is known that the thermal conductivities of the sintered bodies produced in Examples 6–9, 11 and 12 would be at least 0.5 W/cm.K at 25° C.

In Examples 4 and 6–12, the polycrystalline sintered bodies were comprised of an aluminum nitride phase and a calcium aluminate phase estimated to be present in an amount ranging from about 0.5% by volume to about 6% by volume of the sintered body. Specifically, in Example 7, the calcium aluminate phase was determined to be $CaAl_4O_7$ in an amount of about 2.5% by volume and in Examples 9 and 10 it was determined to be $CaAl_2O_4$ in an amount of about 6% by volume of the sintered body.

In Examples 13, 15 and 17–19, the polycrystalline bodies were comprised of an aluminum nitride phase and a strontium aluminate phase estimated to be present in an amount ranging from about 0.5% by volume to about 7% by volume of the sintered body. In Example 15, the strontium aluminate phase was deterimined to be $SrAl_{12}O_{19}$ and in Example 21 it was $SrAl_2O_4$.

In Example 19, the thermal conductivity of the sintered body was determined to be 0.7 W/cm.K at 25° C. From a comparison of Examples 13, 15 and 17–19 and from other work, it is known that the thermal conductivity of the sintered bodies produced in Examples 13, 15, 17 and 18 would be at least 0.5 W/cm.K at 25° C.

In Examples 23, 25 and 27–29, the polycrystalline sintered bodies were comprised of an aluminum nitride phase and a barium aluminate phase estimated to ranged from about 0.5% by volume to about 6% by volume of the sintered body. In Example 25, the barium aluminate phase was determined to be $BaAl_{12}O_{19}$ and in Example 30 it was $BaAl_2O_4$.

In Example 28, the thermal conductivity of the sintered body was determined to be 0.6 W/cm.K at 25° C. From a comparison of Examples 23, 25 and 27–29 and from other work, it is known that thermal conductivity of the sintered bodies produced in Examples 23, 25, 27 and 29 would be at least 0.5 W/cm.K at 25° C.

In Examples 5, 14, 16, 20–22, 24, 26 and 30, the sintering temperature was too low for the given system to produce a sintered body having a porosity of less than about 10% by volume.

What is claimed is:

1. A process for producing a sintered polycrystalline aluminum nitride body having a porosity of less than about 10% by volume and a thermal conductivity of at least 0.5 W/cm.K at 25° C. which consists essentially of forming a mixture consisting essentially of aluminum nitride powder containing oxygen ranging in amount from greater than about 1.0% by weight to less than about 4.0% by weight and an alkaline earth additive, said alkaline earth additive being a member selected from the group consisting of $CaF_2$ ranging from about 0.2% by weight to about 10% by weight, $SrF_2$ ranging from about 0.5% by weight to about 8% by weight, $BaF_2$ ranging from 1% by weight to about 8% by weight, and mixtures of said member ranging from greater than about 0.2% by weight to less than about 10% by weight, said % by weight of said additive being based on the amount of said aluminum nitride powder, shaping said mixture into a compact, said aluminum nitride in said compact having an oxygen content ranging from greater than about 1% by weight to less than about 4.5% by weight, and sintering said compact in a nitrogen-containing nonoxidizing atmosphere at a temperature ranging from about 1800° C. to about 2050° C. producing said polycrystalline body, said sintering temperature being sufficient to produce said sintered body, said nitrogen-containing atmosphere containing sufficient nitrogen to prevent significant weight loss of said aluminum nitride.

2. The process according to claim 1 wherein said atmosphere is nitrogen.

3. The process according to claim 1 wherein said atmosphere is comprised of a mixture of nitrogen and hydrogen, and said hydrogen ranges up to about 5% by volume of said atmosphere.

4. The process according to claim 1 wherein said process is carried out at ambient pressure.

5. The process according to claim 1 wherein said additive is $CaF_2$ ranging from about 3% by weight to about 7% by weight.

6. The process according to claim 1 wherein said additive is $SrF_2$ ranging from about 3% by weight to about 6% by weight.

7. The process according to claim 1 wherein said additive is $BaF_2$ ranging from about 3% by weight to about 6% by weight.

8. The process according to claim 1, wherein mixtures of said member is used ranging from about 3% by weight to about 6% by weight.

9. A process for producing sintered polycrystalline aluminum nitride body having a porosity of less than about 4% by volume and a thermal conductivity of at least 0.5 W/cm.K at 25° C. which consists essentially of forming a mixture consisting essentially of aluminum nitride powder containing oxygen ranging in amount from greater than about 1.0% by weight to less than about 4.0% by weight and $CaF_2$, said $CaF_2$ ranging from about 3% by weight to about 7% by weight based on said aluminum nitride powder, shaping said mixture into a compact, said aluminum nitride in said compact having an oxygen content ranging from greater than about 1% by weight to less than about 4.5% by weight, and sintering said compact in a nitrogen-containing nonoxidizing atmosphere at a temperature ranging from about 1800° C. to about 2050° C. producing said polycrystalline body, said nitrogen-containing atmosphere containing surffient nitrogen to prevent significant weight loss of said aluminum nitride.

10. A process for producing a sintered polycrystalline aluminum nitride body having a porosity of less than about 4% by volume and a thermal conductivity of at least 0.5 W/cm.K at 25° C. which consists essentially of forming a mixture consisting essentially of aluminum nitride powder containing oxygen ranging in amount from greater than about 1.0% by weight to less than about 4.0% by weight and $SrF_2$, said $SrF_2$ ranging from about 3% by weight to about 6% by weight based on said aluminum nitride powder, shaping said mixture into a compact, said aluminum nitride in said compact having an oxygen content ranging from greater than about 1.0% by weight to less than about 4.5% by weight, and sintering said compact in a nitrogen-containing nonxidizing atmosphere at a temperature ranging from about 1800° C. to about 2050° C. producing said polycrystalline body , said nitrogen-containing atmosphere containing sufficient nitrogen to prevent significant weight loss of said aluminum nitride.

11. A process for producing a sintered polycrystalline aluminum nitride body having a porosity of less than about 4% by volume and a thermal conductivity of at least 0.5 W/cm.K at 25° C. which consists essentially of forming a mixture consisting essentially of aluminum nitride powder containing oxygen ranging in amount from greater than about 1.0% by weight to less than about 4.0% by weight and $BaF_2$, said $BaF_2$ ranging from about 3% by weight to about 6% by weight based on said aluminum nitride powder, shaping said mixture into a compact, said aluminum nitride in said compact having an oxygen content ranging from greater than about 1.0% by weight to less than about 4.5% by weight, and sintering said compact in a nitrogen-containing nonoxidizing atmosphere at a temperature ranging from about 850° C. to about 2050° C. producing said polycrystalline body, said nitrogen-containing atmosphere containing sufficient nitrogen to prevent sigificant weight loss of said aluminum nitride.

12. A polycrystalline body having a phase composition consisting essentially of aluminum nitride and calcium aluminate, said calcium aluminate phase ranging from about 0.1% by volume to about 10% by volume of said sintered body, said body having a porosity of less than about 10% by volume of said body and a thermal conductivity of at least about 0.5W/cm.K at 25° C.

13. The polycrystalline body according to claim 12 wherein said calcium aluminate phase is $CaAl_2O_4$.

14. The polycrystalline body according to claim 12 wherein said calcium aluminate phase is $CaAl_4O_7$.

15. The polycrystalline body according to claim 12 wherein said calcium aluminate phase ranges from about 0.1% by volume to about 6% by volume of said sintered body.

16. The polycrystalline body according to claim 12, wherein said body has a porosity of less than about 4% by volume.

17. A polycrystalline body having a phase composition consisting essentially of aluminum nitride and strontium aluminate, said strontium aluminate phase ranging from about 0.1% by volume to about 7% by volume of said sintered body, said body having a porosity of less than about 10% by volume of said body and a thermal conductivity of at least about 0.5 W/cm.K at 25° C.

18. The polycrystalline body according to claim 17 wherein said strontium aluminate phase is $SrAl_{12}O_{19}$.

19. The polycrystalline body according to claim 17 wherein said strontium aluminate phase is $SrAl_2O_4$.

20. The polycrystalline body according to claim 17 wherein said strontium aluminate phase ranges from about 0.1% by volume to about 5% by volume of said sintered body.

21. The polycrystalline body according to claim 17, wherein said body has a porosity of less than about 4% by volume.

22. A polycrystalline body having a phase composition consisting essentially of aluminum nitride and barium aluminate, said barium aluminate phase ranging from about 0.1% by volume to about 6% by volume of said sintered body, said body having a porosity of less than about 10% by volume of said body and a thermal conductivity of at least about 0.5 W/cm.K at 25° C.

23. The polycrystalline body according to claim 22 wherein said barium aluminate phase is $BaAl_{12}O_{19}$.

24. The polycrystalline body according to claim 22 wherein said barium aluminate is $BaAl_2O_4$.

25. The polycrystalline body according to claim 22 wherein said barium aluminate phase ranges from about 0.1% by volume to about 4% by volume of said sintered body.

26. The polycrystalline body according to claim 22, wherein said body has a porosity of less than about 4% by volume.

* * * * *